United States Patent Office 2,704,723
Patented Mar. 22, 1955

2,704,723
PRODUCTION OF PRECOOKED ALIMENTARY PASTE PRODUCTS

Richard S. Poole, Battle Creek, Mich., assignor to Kellogg Company, Battle Creek, Mich., a corporation of Delaware No Drawing. Application September 16, 1953, Serial No. 380,591

4 Claims. (Cl. 99—85)

This invention relates to improvements in the production of alimentary paste composition products.

More particularly, the present invention relates to a new and improved process for the manufacture of products such as macaroni and the like, including spaghetti and others, and to the novel character of the resulting product.

It is an object of the present invention to provide a process whereby products of the class described may be rapidly dried on leaving the extruder or press, to form a product of conventional moisture content, in a period of about one to about one and one-half hours as distinguished from the days previously required for drying, while at the same time avoiding dangers of checking, flaking, or other stress or compression defects, with the end result that a superior product is produced with great economies in time, labor, and equipment.

It is another object of the present invention to produce products of the class described, which are partially precooked, that is, modified or processed to a condition where they may be more rapidly cooked for final consumption, and retain body and substance after cooking for a substantial period of time.

The present trade practice is long, tedious, critical and expensive, because of the checking and flaking of the finished product. Thus, for example, the volume of a piece of macaroni varies with the moisture content. When it picks up moisture the macaroni expands, and when it loses moisture it contracts. Therefore, if macaroni is dried rapidly, the moisture gradient will be large, and the surface, which has a lower moisture content than the interior, will tend to contract. Under certain conditions this will cause the macaroni to check or lose its strength.

In the simplest case, macaroni which has been dried to a moisture content of about 12% and has been allowed to rest until there is no moisture gradient through the goods (moisture is evenly distributed), if it is suddenly moved into air of 30% relative humidity 57—75—18 (57° wet bulb—75° F. dry bulb—18° depression) which corresponds to an equilibrium moisture of 8%, it will begin to dry at a very high rate. The surface will contract until it is stressed beyond its breaking point and it will then crack or check. If the stress is not great enough to cause checking it may decrease the strength of the macaroni temporarily, since the macaroni may be very close to the cracking point and a slight bending will put it beyond the breaking point. If this same macaroni at 12% moisture is put into a warm, humid atmosphere, it will pick up moisture, the surface will expand and pull away from the interior and so cause checking.

It should be noted that each of the foregoing checking has a characteristic appearance. The first type is called "tension check" because the surface contracts and is under tension before it checks. Tension check has the appearance of a network of fine, irregular lines running in all directions over the surface of the macaroni. This type of check is not usually very deep and macaroni with slight tension check sometimes shows up well in a cooking test.

The second type is called "compression check" since the surface is under compression before it checks. In this type, the check lines are generally fairly straight, widely spaced, and run at an angle of about 30° or less to the axis of the macaroni. In very bad compression check, the pressure may be so great that large chips will flake off the macaroni. This type of check seldom shows up well in a cooking test since the cracks are usually deep.

If macaroni of 12% or less moisture is put into cold, humid air (37.5—39—1.5) it will gain strength for a while and then check badly. Apparently, it does not pick up moisture at a very rapid rate until it has cooled down to the air temperature and this takes time. As it slowly picks up moisture, the surface is subjected to compression. Since macaroni is probably stronger in compression than in tension, this stress actually increases the strength up to a certain point because it eliminates some of the tension strength normally associated with bending. After the macaroni has cooled thoroughly, the rate of moisture absorption becomes high and checking finally occurs.

If macaroni at 12% moisture is removed from the dryer while it is still being dried there will be a moisture gradient and the surface will be drier than the interior. Because of this gradient, the macaroni will be more likely to check if put into a dry atmosphere than if the moisture had been allowed to diffuse to the surface during a resting period. The reason is that the moisture in the macaroni is concentrated in the interior and the outside air can dry the surface to a very low moisture content before the interior moisture has a chance to diffuse to the surface. In the "rested" macaroni, part of this moisture has already come to the surface during the rest period.

So far only cases where the macaroni was practically dry and was not plastic have been considered. At moisture above 15%, macaroni has a certain amount of plasticity which increases as the moisture content increases. If the macaroni is dried at a high rate while it is still plastic, the stresses set up by the moisture gradient will be relieved by plastic flow of the dough. When this occurs, the density of the dough at the surface will be greater than the density in the interior. If a high rate of drying is continued, the surface will continue to be dense and the macaroni will lose its elasticity as the moisture content becomes low. As long as drying continues, the moisture gradient will be such that there will be no stresses set up in the macaroni and it will be strong. However, as soon as drying is stopped, the interior moisture will begin to diffuse to the dense surface, the surface will expand and the interior will contract. As can be expected, this will cause compression check and nothing can be done to prevent it; because eventually the moisture will become evenly distributed regardless of the air temperature or humidity. If the surface is not so dense as to cause check, it will, at least, cause a loss of strength and the macaroni will be very susceptible to compression checking caused by moisture pickup.

In standard practice, macaroni and the like products of conventional wall thickness or diameter are formed from a dough or paste composed of selected wheat flours and water, with or without added materials, and have a moisture content of approximately 29% to 32% as they come from the press or extruder, and must be dried to a moisture content of about 10% to 13% for packaging. Heretofore such drying required from about 48 to about 72 hours, a long, tedious, critical and expensive process, tying up a great deal of space and equipment per pound of throughput, and even then the resulting product was subject to the forms of checking and flaking previously described, leaving much to be desired in the character and appearance of the product, its storage stability, and end utility.

In accordance with the present invention I have been able to substantially eliminate these described tendencies toward checking and flaking, to thereby produce a product which is golden colored, translucent, and free of stress or compression defects upon packaging or after shelf storage life. Although it may be ready for service after seven minutes of boiling, it is of such strength that it may be cooked in boiling water for fifteen minutes before it becomes slightly soft, and macaroni boiling for over twenty-five minutes still retains its individual piece character without noticeable flattening, and may be served without rinsing.

I accomplish the objects of my invention by subjecting the shaped paste product of conventional wall thickness or diameter, directly on leaving the extruder, and while still at a moisture content of from about 29% to about 32% and preferably approximately 31%, to cooking in boiling water, i. e. at 212° F., for approximately two minutes, drain, and immediately dry at a temperature of from about 250° F. to about 450° F., and preferably at a temperature of about 325° F., to a moisture content of from about 10% to about 13%, in a period of from about one to about two hours. Thus, for example, macaroni of standard wall thickness leaving the extruder at a moisture content of approximately 31% was boiled in water for about two minutes on leaving the extruder and dried to a moisture content of approximately 11% at a temperature of about 325° F. in a period of about one and one-half hours.

This rapid, high temperature drying may be accomplished by means of currents of hot air while the product is confined in a suitable foraminous tray, trough or cylinder, without danger of setting up of stresses or compression due to modification of the freshly extruded product by the limited precooking, and this step or pretreatment modifies the character, handling properties and stability of the material from the drying thereof, through storage, and into final appearance and utility in preparation for consumption.

As an example of the rapid manner in which the product of the present process may be prepared for consumption, macaroni may be combined with cold water and salt in a saucepan, placed over high heat, brought to a full rolling boil, stirred occasionally with a fork, and after eight minutes the product is ready to serve without any rinsing.

Among the deficiencies of products such as macaroni and spaghetti formed by the prior practices is that they become soft on standing after cooking in restaurants for example while in steam tables. The products of the present invention, however, may be permitted to stand after cooking and retain their firmness for appreciable lengths of time.

I claim as my invention:

1. A method for the production of dried alimentary paste composition food products which comprises, extruding an alimentary paste composition to desired form, cooking it in water at a temperature of about 212° F. for about two minutes, draining the cooking water therefrom and immediately drying it.

2. A method for the production of macaroni, spaghetti and the like dried alimentary paste composition products which comprises, extruding an alimentary paste composition to desired form at a moisture content of from about 29% to about 32% by weight, cooking it in water for about two minutes at a temperature of about 212° F., draining the cooking water therefrom and immediately subjecting it to high temperature drying.

3. A method for the production of macaroni, spaghetti and the like dried alimentary paste composition products which comprises, extruding an alimentary paste composition to desired form at a moisture content of from about 29% to about 32% by weight, cooking it in water for about two minutes at a temperature of about 212° F., draining the cooking water therefrom and immediately drying it to a moisture content of from about 10% to about 13%.

4. A method for the production of macaroni, spaghetti and the like dried alimentary paste composition products which comprises, extruding an alimentary paste composition to desired form at a moisture content of from about 29% to about 32% by weight, cooking it in water for about two minutes at a temperature of about 212° F., draining the cooking water therefrom and immediately drying it to a moisture content of from about 10% to about 13% by heating it at a temperature of from about 250° F. to about 450° F.

References Cited in the file of this patent

UNITED STATES PATENTS

| | | |
|---|---|---|
| 874,279 | Anderson | Dec. 17, 1907 |
| 2,615,809 | Jean | Oct. 28, 1952 |
| 2,677,613 | Shiah | May 4, 1954 |